US006490274B1

(12) United States Patent
Kim

(10) Patent No.: US 6,490,274 B1
(45) Date of Patent: Dec. 3, 2002

(54) TELEPHONY SERVICE SYSTEM EMPLOYING CABLE NETWORK AND TELEPHONY SERVICE METHOD

(75) Inventor: In-hwan Kim, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/140,636

(22) Filed: Aug. 26, 1998

(30) Foreign Application Priority Data

Dec. 29, 1997 (KR) .......................................... 97-76414

(51) Int. Cl.[7] .............................................. H04L 12/66
(52) U.S. Cl. ........................ 370/352; 370/387; 725/106
(58) Field of Search ........................ 370/351, 352–356, 370/485, 486, 487, 400, 401; 725/74, 105, 106, 114, 143, 144

(56) References Cited

U.S. PATENT DOCUMENTS

| 5,999,612 A | * 12/1999 | Dunn et al. .................. 379/212 |
| 6,065,061 A | * 5/2000 | Blahut et al. |
| 6,236,653 B1 | * 5/2001 | Dalton et al. ................ 370/352 |
| 6,310,862 B1 | * 10/2001 | Roy ........................... 370/260 |

FOREIGN PATENT DOCUMENTS

| JP | 4-334142 | 11/1992 |
| JP | 6-112942 | 4/1994 |
| JP | 7-99549 | 4/1995 |
| JP | 7-212494 | 8/1995 |
| JP | 7-336392 | 12/1995 |
| JP | 9-307589 | 11/1997 |
| JP | 10-11381 | 1/1998 |
| JP | 10-210182 | 8/1998 |
| JP | 11-46260 | 2/1999 |
| JP | 11-68851 | 3/1999 |
| WO | WO 97/38511 | 10/1997 |

OTHER PUBLICATIONS

Open Network, 1997.
IEEE Network, Jan./Feb. 1997, vol. 11, No. 1 "Broadband Services over Residential Networks".
Yasuhito Hayashi et all., *Architecture of an Internet Telephony System VocaLink*, NTT R&D, vol. 46, No. 9, Sep. 1997, pp. 93–102.
K. Gudapati, et al., *Local Telephone Service for Cable Subscribers Using Packet Switched Access*, ISS'97 (International Switching Symposium), Sep. 1997 No. 2, pp. 325–329.
*Internet Phone Entering into Practical Use Period*, Nikkei Communications, No. 257, Nov. 1997, pp. 98–111.
Communications of the ACM, vol. 40, No. 7, pp. 64–73, Jul. 1997.
IEEE Network, vol. 11, No. 1, pp. 36–43, Jan./Feb. 1997.

* cited by examiner

Primary Examiner—Ajit Patel
(74) Attorney, Agent, or Firm—Staas & Halsey LLP

(57) ABSTRACT

A telephony service system employing a cable network and a telephony service method. The system includes a directory unit, a plurality of network segment units each including a headend unit, and a plurality of routers respectively formed in each network segment unit. The directory unit stores the IP address corresponding to a telephone number of a first cable phone. The plurality of network segment units each having a headend unit read IP addresses stored in the directory unit based on a received telephone number of a second cable phone, and determine a connection audio session using an Internet protocol from the read IP address to set a call path with the first cable phone. The plurality of routers set a call path between the network segment units. According to the cable network of a packet type, unlike a PSTN network of a switch network, the local call charge is reduced. A wide bandwidth of the cable suppresses deterioration in quality of audio service of the cable network, which may be caused by compression or delay in the PSTN network.

1 Claim, 4 Drawing Sheets

TELEPHONY SERVICE SYSTEM EMPLOYING CABLE NETWORK AND TELEPHONY SERVICE METHOD

CROSS-REFERENCE TO RELATED APPLICATIONS

This application claims the benefit of Korean Application No. 97-76414, filed Dec. 29, 1997, in the Korean Patent Office, the disclosure of which is incorporated herein by reference.

BACKGROUND OF THE INVENTION

1. Field of the Invention

The present invention relates to a telephony service, and more particularly, to a telephony service system employing a cable network as well as a public switched telephone network (PSTN), and to a telephony service method.

2. Description of the Related Art

A public switched telephone network (PSTN) supplying an audio communication service to a user has been used to supply local calls, long distance calls and international telephony services. However, with the increased use of the Internet, telephony service using the Internet has been developed and is being used. In particular, the Internet telephony service has advantages of low costs, so that the use of service for providing long distance calls and international telephony services is rapidly increasing.

FIG. 1 is a block diagram of a conventional system supplying telephony service using the Internet or an intranet. In the system of FIG. 1, an intranet 100 (LAN/WAN) is connected to the Internet 118, and the intranet 100 and the Internet 118 are connected to PSTNs 104 and 112 through IP gateways 102 and 110. A directory server 108 storing a directory data base of Internet telephone users is connected to the intranet 100 and the Internet 118. Also, a plurality of terminals such as PCs 116, 120, and telephones 106 and 114 are connected to networks 100, 118, 104 and 112. The telephony service supplied from the PSTN is supplied between phone-to-phone, phone-to-PC, PC-to-phone and PC-to-PC using the Internet 118 or intranet 100.

For example, telephony service provided between two telephones 106 and 114 of FIG. 1 is as follows. For the sake of convenience, the telephone 106, the PSTN 104, and the Internet protocol gateway 102 of FIG. 1 can be a transmitting party, and the telephone 114, the PSTN 112 and the IP gateway 110 can be a receiving party. It is assumed that both users of telephones 106 and 114 have an IP (Internet protocol) address.

The transmitting party contacts the IP gateway 102 through the PSTN 104 using the telephone 106. Also, the transmitter inputs a telephone number of a receiver according to an audio response service supplied from the IP gateway 102. In the IP gateway 102, address resolution of the directory server 108 is required using the input telephone number, and thus an IP address corresponding to the telephone number of a receiver is brought. Also, the IP gateway 102 performs call signaling (H.225.0 protocol) through the H.323 protocol, and negotiates through the H.245 protocol to set an audio session with the IP gateway 110. The IP gateway 110 of the receiver is connected to a telephone 114 of the receiver through the PSTN 112 using the telephone number obtained by negotiating with the IP gateway 102 of the transmitter. If a speech path between the two telephones 106 and 114 is set, the IP gateway 102 modulates an audio signal transmitted from the telephone 106 through the PSTN 104 to generate packet data, which is transmitted to the IP gateway 110 through the intranet 100 (LAN/WAN). The IP gateway 110 demodulates the received packet data to generate an audio signal, which is transmitted to the telephone 114 through the PSTN 112.

The telephony service of the PSTNs of FIG. 1 has the following problems though.

First, since much time is required to initialize a call, service is usually delayed. In order to receive the service, 5 to 8 telephone numbers are input to call the IP gateway adjacent to the PSTN through which the call is being initiated, and then 5 to 8 telephone numbers of the receiver must be input according to the demand of the IP gateway. Also, in public service, a PIN number, e.g., 10-digital ID number must be input. Thus, 30 to 60 seconds are required to realize a call. The IP gateway uses a higher protocol, e.g., TCP/IP (transmission control protocol/Internet protocol) or UDP/IP(user datagram protocol/Internet protocol), which may cause delays compared to the PSTN. Also, the Internet bandwidth varies so that additional delays can be generated.

Second, in order to transmit more data per unit time in transmission of an audio signal, the audio signal is compressed, which may further deteriorate the sound quality. Also, the service delay influences the sound quality.

Third, the above-described method of completing a call is complicated, i.e., telephone numbers must be input twice, and a PIN number must be input.

Fourth, two or more PSTNs are required for a call, so that the call charge is expensive. Thus, the call charges using the Internet phone are saved only for long distance and international calls, and charges for local calls are not saved.

SUMMARY OF THE INVENTION

To solve the above problems, it is an object of the present invention to provide a telephony service system employing a cable network together with a PSTN to supply low cost telephony service, and to enable intercommunication with a user of the usual PSTN telephony service, and a telephony service method.

Additional objects and advantages of the invention will be set forth in part in the description which follows and, in part, will be obvious from the description, or may be learned by practice of the invention.

Accordingly, to achieve the above and other objects of the present invention, there is provided a telephony service system between first and second cable phones in a cable network having a directory unit, a plurality of network segment units each including a headend unit, and a plurality of routers respectively formed in each network segment unit.

The directory unit stores the IP address corresponding to a telephone number of a first cable phone. The plurality of network segment units each having a headend unit read IP addresses stored in the directory unit based on a received telephone number from a second cable phone, and determine a connection audio session using an Internet protocol from the read IP address to set a call path with the first cable phone. The plurality of routers set the call path between the network segment units.

To further achieve the above and other objects of the present invention, there is provided a telephony service method between first and second cable phones in a cable network, having three steps. The first step is inputting a telephone number of the first cable phone. The second step is checking a directory to determine whether there is an IP address corresponding to the telephone number input in the first step. The third step is setting a peer-to-peer Internet protocol telephony when it is determined in the second step that there is the IP address, to set a call path between the first and second cable networks.

To still further achieve the above and other objects of the present invention, there is provided a telephony service method between a telephone of a PSTN and a cable phone of a cable network, having seven steps. The first step is inputting a telephone number of a receiving party. The second step is determining, through a directory access protocol, whether the telephone number input in the first step is a telephone number of the PSTN. The third step is setting a call path between the cable phone and the telephone of the PSTN through the Internet telephony gateway if it is determined in the second step that the telephone number is for the PSTN. The fourth step is inputting the telephone number of the PSTN to the cable network. The fifth step is setting a call path with an Internet telephony gateway for connecting the PSTN phone to the cable network through a predetermined network. The sixth step is determining whether there is an IP address corresponding to the telephone number input in the fourth step. The seventh step is setting a peer-to-peer IP telephony between the telephone of the PSTN and the cable phone of the cable network if it is determined that there is the IP address in the sixth step.

BRIEF DESCRIPTION OF THE DRAWINGS

The above objectives and advantages of the present invention will become more apparent by describing in detail a preferred embodiment thereof with reference to the attached drawings in which.

DESCRIPTION OF THE PREFERRED EMBODIMENTS

Reference will now made in detail to the present preferred embodiments of the present invention, examples of which are illustrated in the accompanying drawings. The embodiments are described below in order to explain the present invention by referring to the figures.

Figure 1:
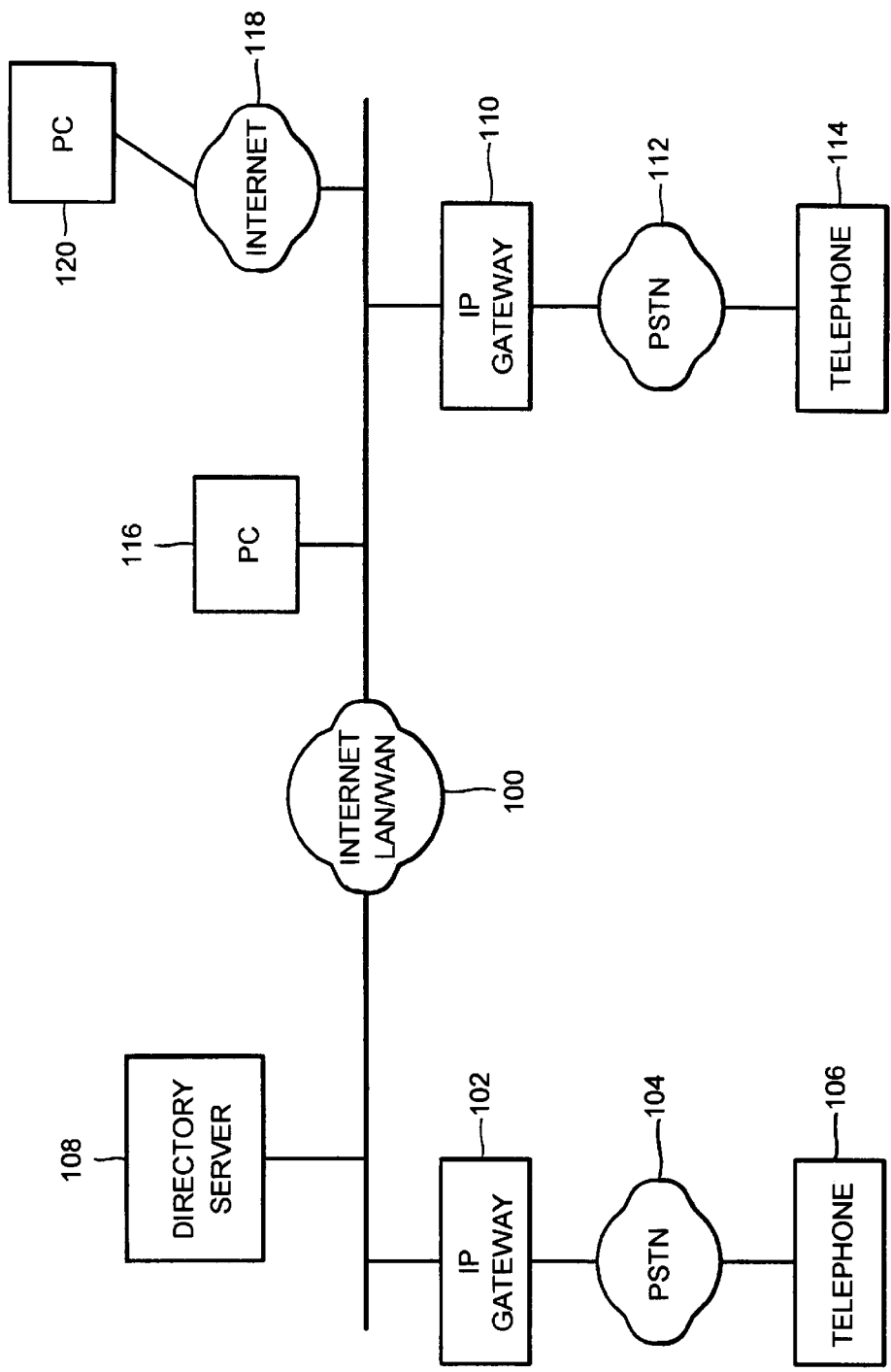
FIG. 1 is a block diagram of a conventional telephony service system using the Internet or an intranet.
Figure 2:
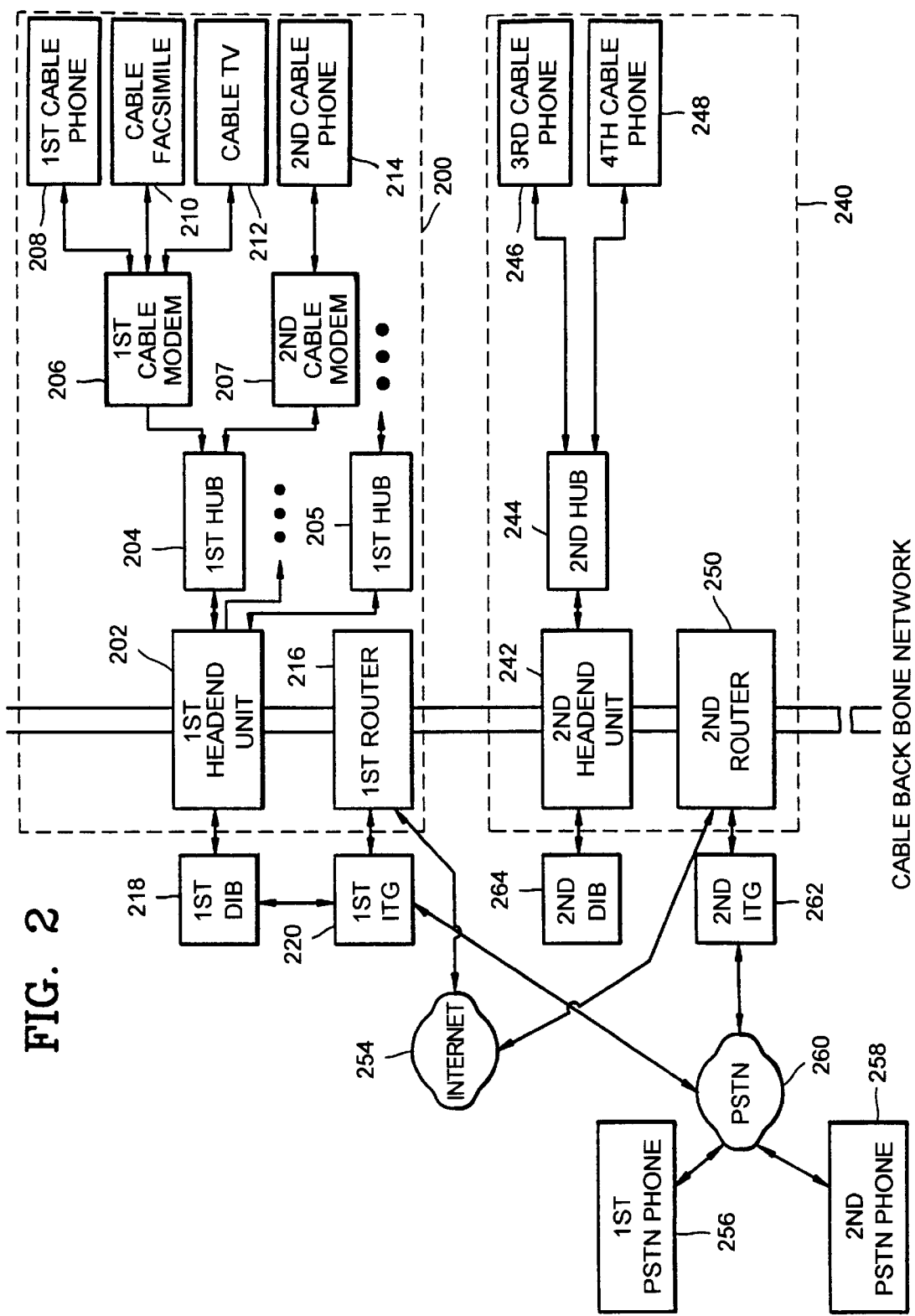
FIG. 2 is a block diagram of a telephony service system using a cable network according to an embodiment of the present invention.

The system shown in FIG. 2 includes first and second network segment units 200 and 240, first and second DIBs (directory information bases) 218 and 264, first and second ITGs (Internet telephony gateways) 220 and 262, the Internet 254 and a PSTN 260. Also, the PSTN 260 is connected to a plurality first and second of PSTN phones 256 and 258. The PSTN 260 is connected to the first and second ITGs 220 and 262 through a T1/T2/T3/E1 network.

The first network segment unit 200 includes a first headend unit 202, a first router 216, two first hubs 204 and 205, first and second cable modems 206 and 207, first and second cable phones 208 and 214, a cable facsimile 210 and a cable TV 212. The second network segment unit 240 includes a second headend unit 242, a second router 250, a second hub 244 and third and fourth cable phones 246 and 248.

IP (Internet protocol) addresses corresponding to telephone numbers of the first through fourth cable phones 208, 214, 246 and 248 are stored in the first and second DIBs 218 and 264. The first headend unit 202 receives a telephone number from the first or second cable phone 208 or 214 through the first or second cable modem 206 or 207 and the first hubs 204 and 205 to read the IP address corresponding to the telephone number stored in the first DIB 218. Also, the first headend unit 202 determines the connection audio session to set a call path with the third or fourth cable phone 246 or 248. The first and second cable phones 208 and 214 connect calls to the third and fourth cable phones 246 and 248 through the first and second headend units 202 and 242 and the first router 216. The first and second routers 216 and 250 set a call path between the first and second network segment units 200 and 240, with the first and second ITGs 220 and 262 or with the Internet 254. Thus, a user of one of the headend units can call a user of another headend unit or the PSTN phone.

The first and second network segment units 200 and 240 of FIG. 2 are formed in a tree type network using hubs 204, 205, 244, ..., and it is assumed that each of the cable phones is an Ethernet phone including an Internet protocol, capable of receiving an audio signal of the Internet. Also, if a terminal supplies an image unlike the typical PSTN phone, the cable phone can function as a video phone. Also, the cable facsimile 210 and the cable TV 212 can be used through the cable modems 206 and 207. In FIG. 2, the first and second network segment units 200 and 240 are shown, however a plurality of network segment units may be connected to a cable backbone network. Thus, a cable network connected to the plurality of network segment units may be set to one local intranet network.

Figure 3:
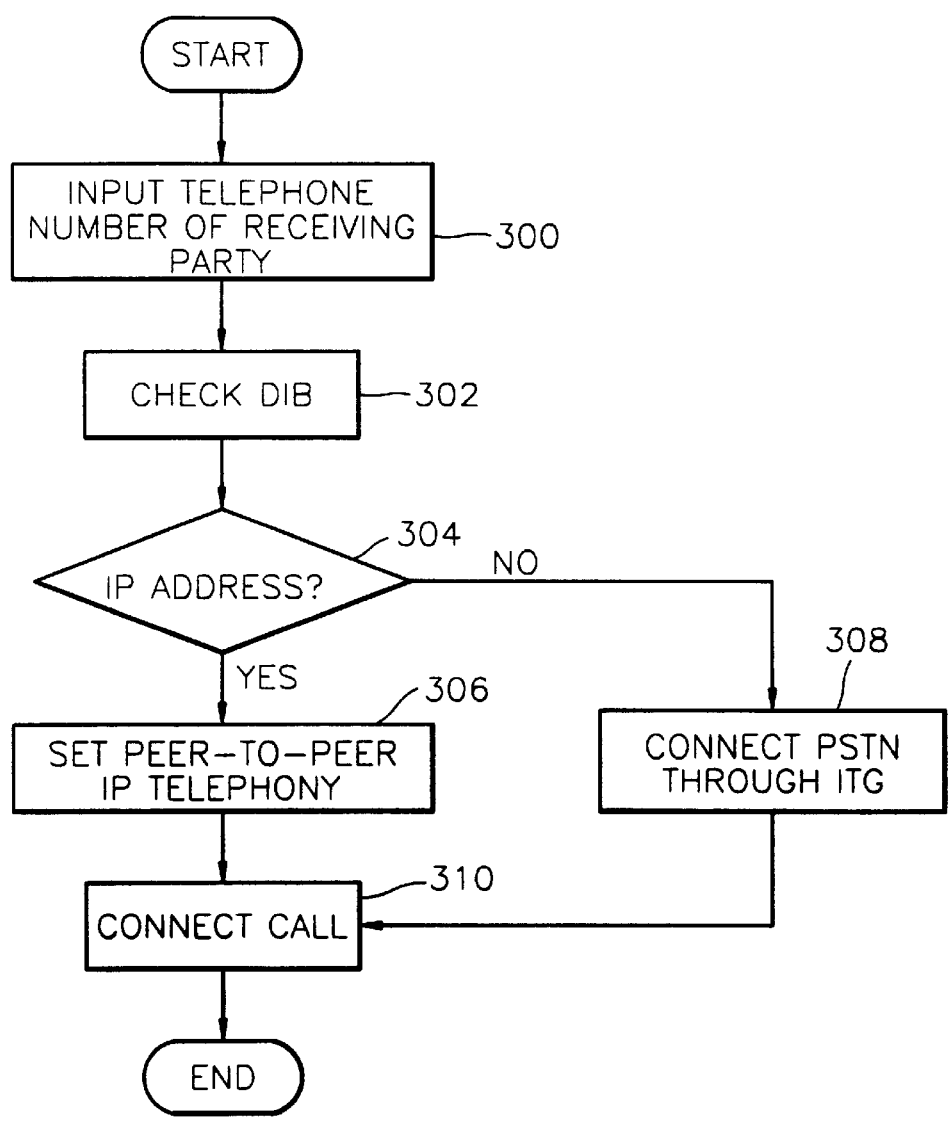
FIG. 3 is a flowchart illustrating a call process within the cable network or a call process from the cable network to a PSTN shown in FIG. 2.
Figure 4:
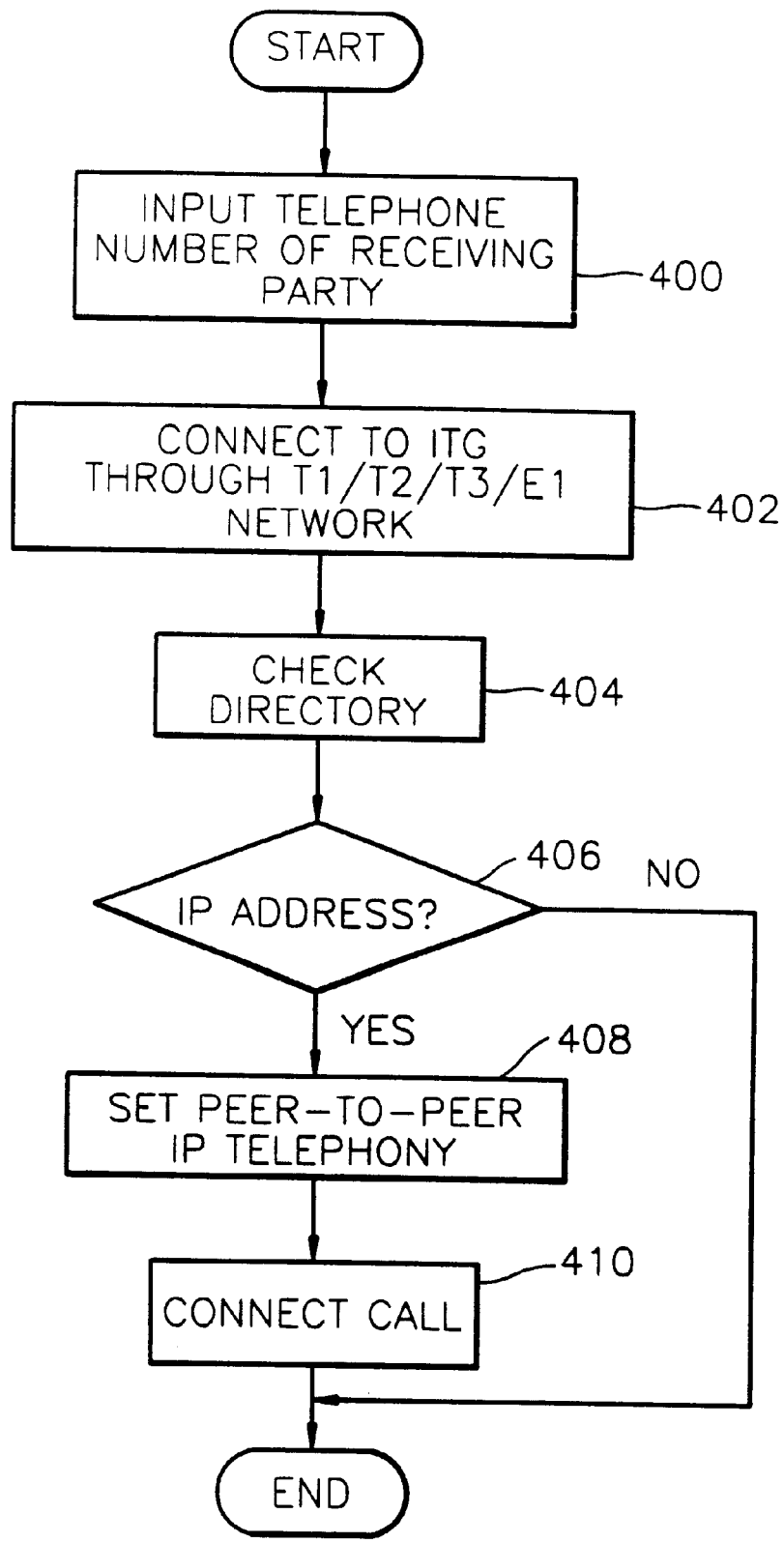
FIG. 4 is a flowchart illustrating a call process from the PSTN to the cable network shown in FIG. 2.

Subsequently, the operation of the system of FIG. 2 will be described with reference to FIGS. 3 and 4.

A call of the cable network or to the PSTN will be described with reference to FIG. 3. The telephone number of a receiver is input (step 300). In the case of the cable network, the first, second, third or fourth cable phone 208, 214, 246 or 248 is a receiver, and in the case of a call of the cable network to the PSTN, the first or second PSTN phone 256 or 258 is a receiver. The telephone number system of the cable network includes a typical telephone number and an IP address pair as shown in Table 1 to easily link with the PSTN, and may have various attributes.

Table 1 shows directory information stored in DIBs 218 and 264.

TABLE 1

| Telephone number | IP address | Attributes |
| --- | --- | --- |
| 0331-ABCD-WXYZ | XXX.XXX.XXX.XXX | ... |
| 02-EFGH-STUV | YYY.YYY.YYY.YYY | ... |
| 053-IJKL-OPQR | ZZZ.ZZZ.ZZZ.ZZZ | ... |

If the telephone number is input, the first head end unit 202 (assuming the first or second cable phone 208 or 214 initiates the call) checks the first DIB 218 (step 302) to determine whether there is an IP address corresponding to the input telephone number from the first or second cable phone 208 or 214 (step 304). If it is determined in step 304 that there is an IP address, peer-to-peer IP telephony is set between the first or second cable phone 208 or 214 and the third or fourth cable phone 246 or 248 (step 306) to connect a call (step 310).

If it is determined in step 304 that there is no IP address, the first headend unit 202 sets a call path with the first and second ITGs 220 and 262 through the first router 216 to connect a call with the first PSTN phone 256 or the second PSTN phone 258 (step 308).

A call from the PSTN to the cable network will be described with reference to FIG. 4.

A user inputs the telephone number of a receiver to the first or second PSTN phone 256 or 258 (step 400). One of the first through fourth cable phones 208, 214, 246 and 248 is the receivers. The PSTN 260 is connected to the first and second ITGs 220 and 262 through the T1/T2/T3/E1 network (step 402). If the PSTN 260 is connected to the first and second ITGs 220 and 262, the routers 216 and 250 set a call path between the ITGs 220 and 262 and the first and second headend units 202 and 242. If the call path is set, the first and second headend units 202 and 242 check the first and second DIBs 218 and 264 (step 404), and thus it is determined whether there is an IP address corresponding to the telephone number input from the first or second PSTN phone 256 or 258 (step 406). If it is determined in step 406 that there is an IP address, peer-to-peer IP telephony is set between the first and second PSTN phone 256 or 258 and one of the first through fourth cable phones 208, 214, 246 or 248 (step 408) to connect the call (step 410). If it is determined in step 406 that there is no IP address, the process skips to the END step.

Meanwhile, in the system of FIG. 2, telephony service between the cable network and the Internet can be realized by the conventional Internet telephony.

As described above, the cable network according to the present invention being regarded as an intranet network, can supply audio unlike the conventional PSTN phone. Also, if the terminal supplies an image, the cable phone can function as a video phone, and can be interlinked with various Internet applications.

Accordingly, the cable network of a packet type network supplies telephony service, so that the call charge of a local call service as well as long distance or the international service is also reduced as compared to the PSTN. Also, a wide bandwidth of the cable suppresses deterioration in the audio quality of the cable network, which is caused by compression or delays of the PSTN.

The invention is not limited to the illustrated embodiment and many changes and modifications can be made within the scope of the invention by a person skilled in the art.

What is claimed is:

1. A telephony service system, comprising:

a cable network;

a plurality of directory units each of which stores at least one internet protocol (IP) address corresponding to a telephone number;

a plurality of internet telephone gateways (ITGs); and a plurality of network segment units, each segment unit comprising:
   a cable phone,
   a router, and
   a head end unit which:
      requests the at least one IP address from one of the plurality directory units based on the corresponding telephone number provided by the cable phone;
      sets a call path via the cable network for peer to peer IP telephony between the cable phone and a cable phone in another of the plurality of network segments using the requested IP address if the requested IP address is stored in the one of the plurality of directory units, and
      sets a call path through the router with one of the plurality of ITGs to connect a call path with one of a plurality of telephones on a public switched telephone network if the requested IP address is not stored in the one of the plurality of directory units.

* * * * *